(No Model.)
J. F. BAUGH.
CHURN.
No. 567,018. Patented Sept. 1, 1896.
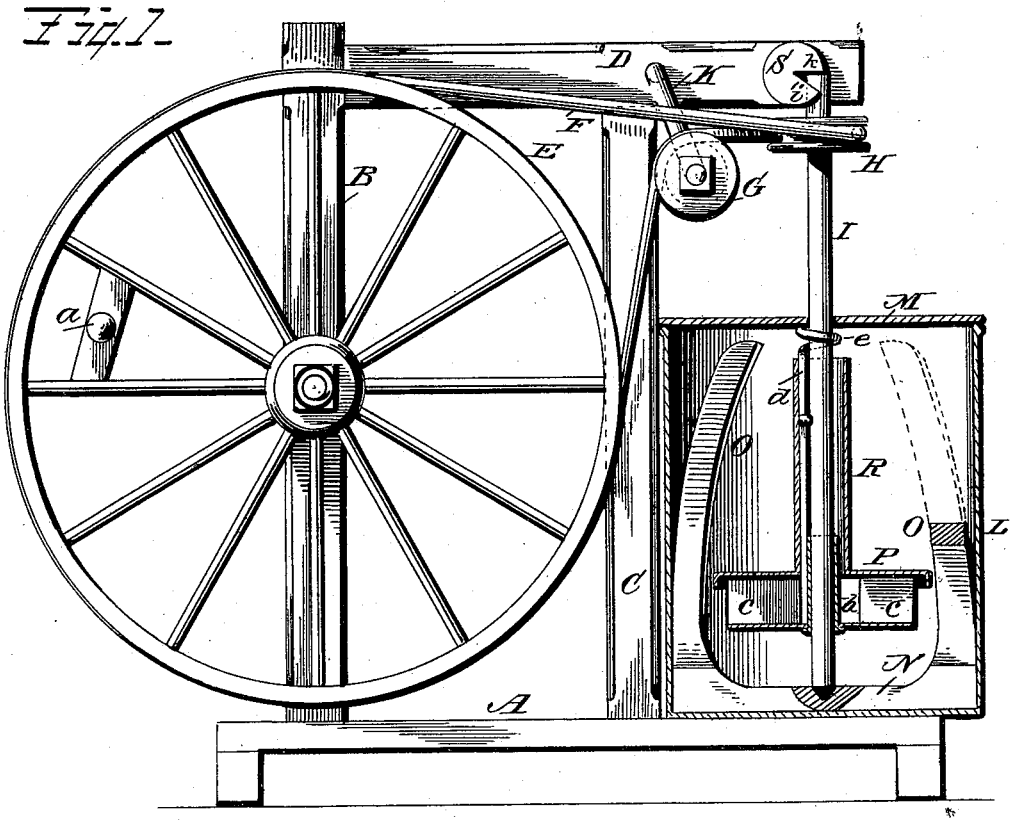
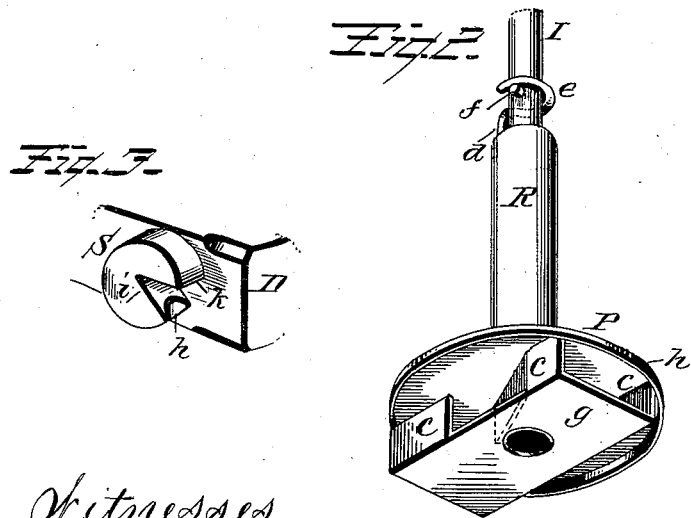
Witnesses
D. Williamson,
Geo. E. Wilber,
Inventor
John F. Baugh,
per Chas. H. Fowler
Attorney.

UNITED STATES PATENT OFFICE.

JOHN FRANKLIN BAUGH, OF BOX, MISSISSIPPI.

CHURN.

SPECIFICATION forming part of Letters Patent No. 567,018, dated September 1, 1896.

Application filed June 18, 1896. Serial No. 595,982. (No model.)

*To all whom it may concern:*

Be it known that I, JOHN FRANKLIN BAUGH, a citizen of the United States, residing at Box, in the county of Simpson and State of Mississippi, have invented certain new and useful Improvements in Churns; and I do hereby declare that the following is a full, clear, and exact description of the same, reference being had to the annexed drawings, making a part of this specification, and to the letters of reference marked thereon.

The present invention has relation to that class of rotary churns in which the dasher has imparted to it, through the medium of a drive-wheel connecting with the dasher-shaft by means of a belt and pulley, a rotary motion; and the object thereof is to improve the construction of the churns of the above-mentioned character; and the invention consists in a churn constructed substantially as shown in the drawings and hereinafter described and claimed.

Figure 1 of the drawings is a side elevation of a churn and operating mechanism constructed in accordance with my invention, the cylinder, dasher-head, and agitator being shown in section; Fig. 2, a perspective view of the dasher; Fig. 3, a detail perspective view showing the bearing-block for the upper end of the dasher-shaft.

In the accompanying drawings, A represents a suitable support, to which a frame is connected consisting of the two uprights or standards B C and the horizontal beam D; but any form of frame may be substituted for that shown that will properly support the driving mechanism of the churn.

To the upright or standard B is suitably journaled a drive-wheel E, provided with a handle *a* for turning it, the periphery of the wheel being grooved to receive a cord or belt F. This cord or belt extends over a grooved pulley G, connecting with the horizontal beam D, and around a groove-pulley H upon the dasher-shaft I. The pulley G forms a guide for the cord or belt F and is connected to a pivotal hanger K, said hanger being pivoted to the beam D, so that it will automatically adapt itself to the tension of the cord or belt at all times. The weight of the pulley G upon the end of the hanger K has a tendency to bring the hanger to a vertical or upright position, and in so doing it presses against the cord or belt and keeps it taut. The churn-cylinder L rests on the support A and is provided with a suitable cover M, through which the dasher-shaft I extends.

The lower end of the dasher-shaft has its bearing in a cross-bar N, which rests upon the bottom of the churn-cylinder, which cross-bar has upwardly-extending and spirally-curved agitator-arms O, against which the milk or cream is projected by the rotation of the dasher. The dasher P is open at its sides and has inwardly-curved wings *c* and a closed bottom *g*, the dasher also having a circumferential flange *h* to prevent the milk or cream from too readily passing out from between the curved wings. The dasher, with its curved wings, circumferential flange, and the closed bottom, gives to the milk or cream a thorough agitation when the dasher is in motion. The dasher has a tubular extension R, and to the inner side of this tubular extension is securely fastened a rod *d*, which terminates at its upper end in a spiral loop *e*, through which the shaft I passes. A pin *f* upon said shaft, in connection with the spiral loop, prevents the shaft from turning independent of the dasher by forming a lock between the shaft and tubular extension. To prevent the dasher from moving laterally and holding it in a fixed position with relation to the shaft, a sleeve *b* is provided, through which the lower end of the shaft closely fits, thereby preventing any sidewise wabbling of the dasher when rapidly revolving upon its axis, but allowing of the dasher being readily detached from the shaft, when desired, for cleaning or for other purposes.

The upper end of the shaft I bears against a block or head S, a groove *h* being formed in the block or head for the shaft to rest against, and also a V-shaped notch *i* is formed, so as to present a shoulder *k*, against which the extremity of the shaft abuts to hold said shaft in place and prevent it from working up out of the bearing in the cross-bar N. This block or head is secured to the beam D near the end thereof and in such position as will be in line with the shaft.

Having now fully described my invention, what I claim as new, and desire to secure by Letters Patent, is—

A churn-dasher, a cross-bar resting on the bottom thereof and provided with spirally-curved agitators, a dasher having a circumferential flange, inwardly-curved wings and closed bottom, a tubular extension, a rod secured to the inner side thereof and terminating at its upper end in a spiral loop, a sleeve extending up into the tubular extension, and a dasher-shaft passing through the loop and sleeve and having a pin to engage said loop, and suitable means for operating the shaft, substantially as and for the purpose specified.

In testimony that I claim the above I have hereunto subscribed my name in the presence of two witnesses.

JOHN FRANKLIN BAUGH.

Witnesses:
C. P. GRIGGARD,
J. C. LEE.